F. H. LACEY.
EXCAVATING APPARATUS.
APPLICATION FILED APR. 27, 1914.

1,180,303. Patented Apr. 25, 1916.
2 SHEETS—SHEET 1.

Witnesses:
Arthur H. Culver
Robert F. Bracke

Inventor
Frank Herbert Lacey
by Lynn A. Williams
Atty.

F. H. LACEY.
EXCAVATING APPARATUS.
APPLICATION FILED APR. 27, 1914.
1,180,303.
Patented Apr. 25, 1916.
2 SHEETS—SHEET 2.
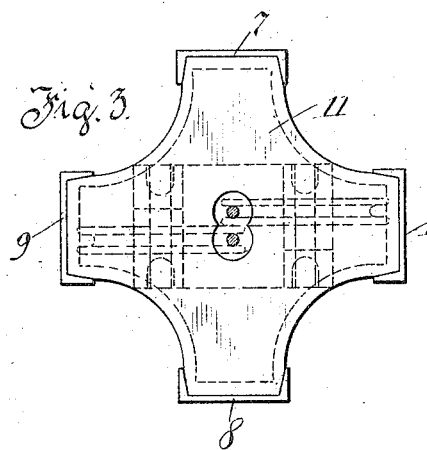
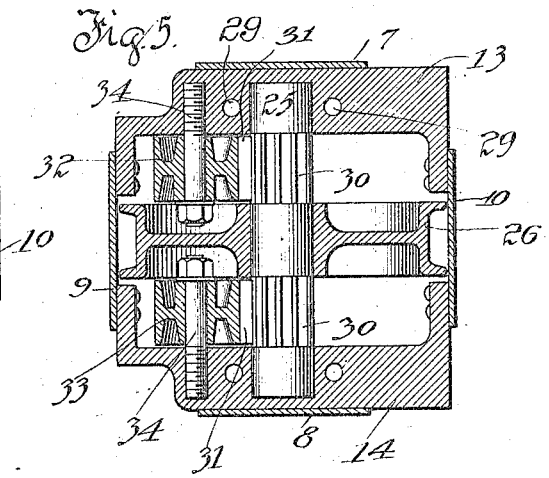
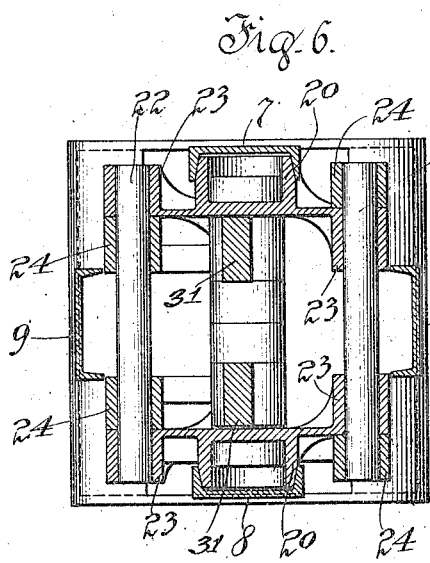
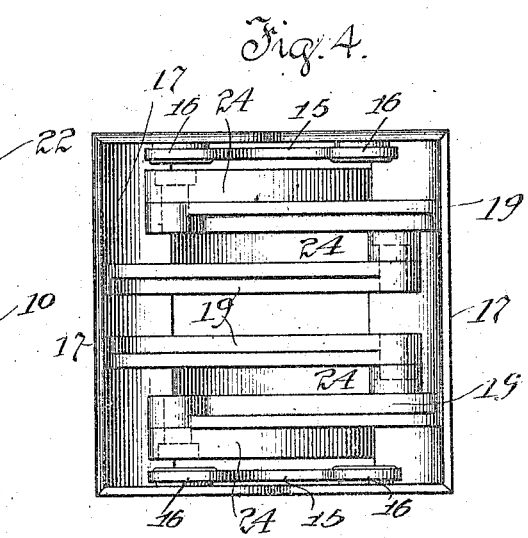
Witnesses:
Robert F. Bracke
Inventor:
Frank Herbert Lacey

UNITED STATES PATENT OFFICE.

FRANK HERBERT LACEY, OF CEDAR RAPIDS, IOWA.

EXCAVATING APPARATUS.

1,180,303.  Specification of Letters Patent.  Patented Apr. 25, 1916.

Application filed April 27, 1914. Serial No. 834,792.

*To all whom it may concern:*

Be it known that I, FRANK HERBERT LACEY, a citizen of the United States, residing at Cedar Rapids, in the county of Linn and State of Iowa, have invented a certain new and useful Improvement in Excavating Apparatus, of which the following is a full, clear, concise, and exact description, reference being had to the accompanying drawings, forming a part of this specification.

My invention relates to excavating or digging machines, and is particularly concerned with the provision of a machine wherein pivoted shells or scoops are forced into the material being excavated, these scoops being provided with suitable mechanism for closing them upon each other at their lower edges by the action of the hoisting apparatus with which the excavating or digging machine proper is associated. The said pivoted shells or scoops are also capable of being operated to forcibly eject the excavated material from the same after the digging or excavating machine has been carried to the point at which the excavated material is to be dumped.

The principal objects of my invention are to provide an apparatus of this class that is durable in construction, one that may be easily and economically manufactured, and one that will cope successfully with refractory materials such, for instance, as coarse gravel deposits, boulders in any sort of gangue, frozen earth or gummy clays.

The embodiment of my invention herein described and subsequently claimed is in the form of a unitary structure.

Broadly, the apparatus comprises pivoted shells or scoops, mechanism arranged to be operated by the hoisting apparatus to lift or lower the excavating machine as a whole and to operate the shells or scoops, and devices interposed between the shells or scoops and the mechanism controlled by the hoisting machine whereby when said mechanism is operated the shells or scoops are moved together to constitute a receptacle having a closed bottom, or are forced apart to forcibly eject the excavated material from the receptacle formed by the shells or scoops.

My invention is more fully set forth in the following description, and is illustrated in the accompanying drawings, in which—

Figure 1:
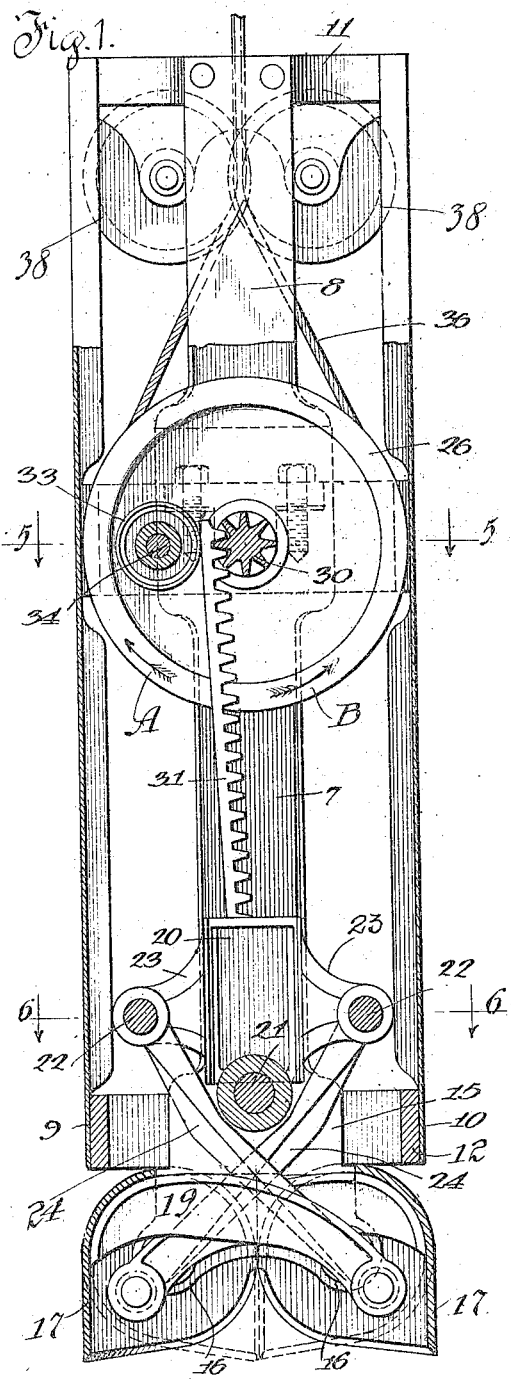
Figure 2:
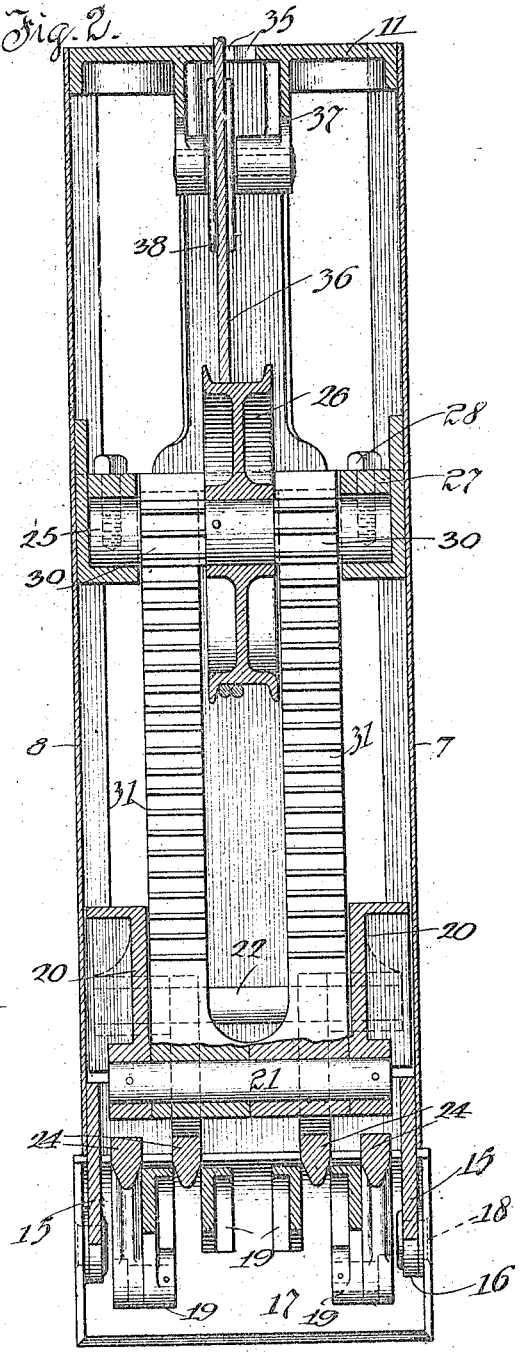

Figure 1 is a view, partly in section and partly in elevation, of the excavating or digging machine of my invention; Fig. 2 is a vertical sectional view of the same; Fig. 3 is a top plan view of the apparatus illustrated in Figs. 1 and 2; Fig. 4 is a bottom plan view of the same; and Fig. 5 is a horizontal sectional view taken on the line 5—5 of Fig. 1 looking in the direction indicated by the arrows. Fig. 6 is a similar view taken on line 6—6.

Similar reference numerals refer to similar parts throughout the several views.

The apparatus illustrated in the drawings comprises four vertically-disposed channel members 7, 8, 9 and 10, each one of which has its upper end bolted or otherwise secured to a frame or block 11 that may conveniently have the conformation of a Maltese cross, as is most clearly shown in Fig. 3. The lower end of each of the channel members 7, 8, 9 and 10 is bolted or otherwise secured to a lower frame 12. Attention is directed to the fact that the flanges of the channel members 7, 8, 9 and 10 are conformed to lie in the same planes as their associated base sections in order that the channel members may be readily attached to the lower frame 12. Supported by the channel members 7, 8, 9 and 10 and located between the upper frame 11 and the lower frame 12 is a drum and pulley supporting frame, which conveniently comprises two blocks 13 and 14, which are riveted, bolted or otherwise secured to the channel sections. Attention is directed to the fact that the channel sections are flattened at the points where they are attached to the blocks 13 and 14, this being most clearly illustrated in Fig. 5 of the drawings.

The lower frame 12 comprises a pair of downwardly-extending portions 15, 15, and each of these downwardly-extending portions comprises a pair of ears 16, 16 which serve to support the shells or scoops to be hereinafter referred to. Pivoted to the ears 16, 16 of the downwardly-projecting portions 15, 15 of the lower frame 12 is a pair of shells or scoops, shown at 17, 17. The shells or scoops are attached to the downwardly-projecting portions 15 by means of pivot pins 18, which may be riveted in position as shown, or any other suitable pivot means may be employed. Each of the scoops or shells is provided with lower cutting edges, as is most clearly shown in Fig. 1.

Each of the shells or scoops 17 has rigidly attached to the inner surface thereof a pair of arms 19, 19 which project over into the other shell or scoop. These arms 19, 19 serve as operating levers whereby the shells or scoops 17, 17 may be turned upon their pivots 18. The arms or levers 19, 19 are disposed in staggered arrangement, as is clearly shown in Fig. 2, in order that they may not interfere with each other when the excavating machine is operated.

Movable within the frame formed by the channel members 7, 8, 9 and 10 is a cross-head comprising oppositely-disposed cross-head members 20, 20, each of which has a portion arranged to slide in the adjacent one of the channel members 7 and 8. The cross-head members 20, 20 are connected by a shaft 21 mounted in the cross-head members 20, 20 as most clearly shown in Fig. 6, and a pair of shafts 22, 22 mounted in the laterally-extending arms 23, 23 of the cross-head members 20, 20.

Each one of the arms or levers 19 associated with the shells or scoops 17, 17 has the free end thereof connected by means of a link 24 with one of the shafts 22, 22 mounted in the cross-head. It will be noted that the pair of links 24, 24 attached to the arms or levers 19, 19 associated with one of the shells or scoops are connected with one of the shafts 22, 22, whereas the links 24, 24, associated with the arms or levers 19, 19 for the other shell or scoop are connected with the other one of the shafts 22, 22. It will be seen that owing to the connection between the cross-head and the shells or scoops, when the cross-head is moved upwardly the shells or scoops are moved to the closed position illustrated in dotted lines in Fig. 1. When the cross-head is moved downwardly the shells or scoops are moved into the open position illustrated in full lines in the drawings.

The blocks 13 and 14, most clearly shown in Fig. 5, are recessed to receive the ends of a shaft 25 which has fixed upon the central portion thereof a drum 26. The shaft 25 is retained in operative position by means of retaining plates 27, 27 secured to the blocks 13 and 14 by means of bolts or screws 28, 28 entering the apertures 29, 29 in the said blocks 13 and 14. This arrangement is most clearly illustrated in Figs. 2 and 5. Pinions 30, 30 are fixed with respect to the shaft 25 and are preferably formed by cutting gear teeth in the shaft 25. These pinions 30, 30 are adapted to coöperate with suitable racks, to be presently referred to.

Mounted upon the shaft 21 connecting the cross-head members 20, 20 is a pair of racks 31, 31. These racks 31, 31 project upwardly from the cross-head and mesh with the pinions 30, 30 formed integral with the transverse shaft 25. The racks 31, 31 are held in engagement with the pinions 30, 30 by means of guide rollers 32, 33 conveniently mounted upon pins 34, 34 threaded into the blocks 13 and 14. Formed in the upper frame or block 11 is a pair of openings 35, 35 through which extend the runs of a cable 36 which is passed preferably several times around the drum 26. Formed integral with the upper frame or block 11 are the downwardly-projecting brackets 37 which serve to support sheaves 38, 38. The sheaves 38, 38 serve merely to guide the cable 36.

Having now described the apparatus illustrated in the drawings, I shall proceed to explain the operation thereof:

It will be understood, of course, that the ends of the cable 36 may be connected with and controlled by any suitable form of hoisting machine, so I have not deemed it necessary to illustrate such a hoisting machine in the accompanying drawings. I may state that the hoisting machine should comprise mechanism for taking in either end of the cable 36 alone and means for taking in both ends of the cable 36 simultaneously. When the apparatus of my invention is in the condition shown in the drawings and the same is to be utilized for excavating purposes, the hoisting machine is operated to play out both ends of the cable 36 in unison to permit the excavating apparatus proper to fall. When the excavating apparatus falls, as set forth, the cutting edges of the shells or scoops 17, 17 are driven into the material to be excavated with a force resulting from the inertia of the lowering of the entire digging or excavating apparatus as supported by the cable 36. After the cutting edges of the shells or scoops 17, 17 have been driven into the material to be excavated, one end of the cable 36 is taken into the hoisting machine to rotate the drum 26 in the direction indicated by the arrow A in Fig. 1. When this occurs, the racks 31, 31 are raised, due to their engagement with the pinions 30, 30 and the cross-head is also raised, thus operating the arms or levers 19, 19 through the links 24, 24 to move the shells or scoops to the closed position illustrated in dotted lines in Fig. 1. When this has taken place, both ends of the cable 36 are taken into the hoisting machine in unison to lift the excavating apparatus which may then be moved to any suitable point. When the excavated material is to be discharged from the receptacle formed by the shells or scoops 17, 17, the end of the cable 36 first taken into the hoisting apparatus to effect the closing of the shells or scoops 17, 17 is played out to permit the drum 26 to turn in the direction indicated by the arrow B in Fig. 1 while the other end of the cable is held by the hoisting machine. When this takes place the cross-head as well as the entire device is forced downwardly, and the shells or scoops 17, 17 are, by virtue of their connection with the cross-head, turned upon their pivots to open position. When the scoops reach their open position they will engage the members or stops 15, whereupon the downward travel of the excavator will be suddenly stopped with a jerk. Attention is also directed to the fact that the arms 19 extend when the scoops are in their open position into the adjacent scoop so that they serve to mechanically force the material from the scoops. It will thus be seen that the excavated material contained within the receptacle formed by the shells or scoops 17, 17 is forcibly and mechanically ejected from the excavating apparatus.

The apparatus herein shown and described has many advantages of construction and operation that will be apparent to one skilled in the art to which my invention appertains. For instance, by virtue of the novel connection between the scoops and cross-head, a comparatively great force is exerted upon the scoops, tending to close the same when the cross-head starts on its journey, and this force becomes less as the scoops approach their closed positions. By securing the operating levers to the scoops at points remote from their cutting edges, they do not interfere with the filling of the scoops. Attention is directed to the fact that comparatively long racks are employed, these racks being disposed in substantially vertical planes at all times.

The discharging of the burden from the shells or scoops is accomplished by a positive strain dependent upon the entire weight of the excavating machine suspended from the hoisting cable or cables.

The apparatus herein shown and described is particularly adaptable for use in such work as digging wells, pole-holes, etc., inasmuch as vertical holes may by the employment of my apparatus be effectually and cheaply made.

From the above description, it will be seen that I have provided an excavating or digging apparatus that may be employed to accomplish a multitude of useful purposes.

While I have described but one embodiment of my invention, I appreciate the fact that many modifications and changes may be made without departing from the scope of my invention, and I therefore do not wish to be limited to the construction illustrated in the accompanying drawings, but desire to claim broadly any equivalent constructions that may suggest themselves to those skilled in the art.

What I claim as new and desire to secure by Letters Patent of the United States is:

1. Excavating apparatus comprising in combination a frame work, a pair of scoops or shells pivoted to the lower end of the frame work and arranged when in closed position to form a single receptacle, an arm carried by each of the scoops extending when the scoops are in open position into the adjacent scoop, a vertically reciprocating cross-head, links for connecting the cross-head with the arms and means for operating or reciprocating the cross-head.

2. Excavating apparatus comprising a frame work, a pair of scoops or shells pivoted at substantially their center portions to the lower end of the frame work and arranged when in closed position to form a single receptacle, an arm carried by each of the scoops extending when the scoops are in open position into the adjacent scoop, a vertically reciprocating cross-head, links for connecting the cross-head with the arms, and means for operating the cross-head.

In witness whereof, I hereunto subscribe my name this 22nd day of April, A. D. 1914.

FRANK HERBERT LACEY.

Witnesses:
Geo. F. Miller,
O. M. Larsen.

Copies of this patent may be obtained for five cents each, by addressing the "Commissioner of Patents, Washington, D. C."